J. Stevens.

Excavator.

No. 57,050. Patented Aug. 7, 1866.

Witnesses:
W. E. Manz
J. W. Authit

Inventor:
Judd Stevens

J. Stevens.
Excavator.
Nº 57,050. Patented Aug. 7, 1866.
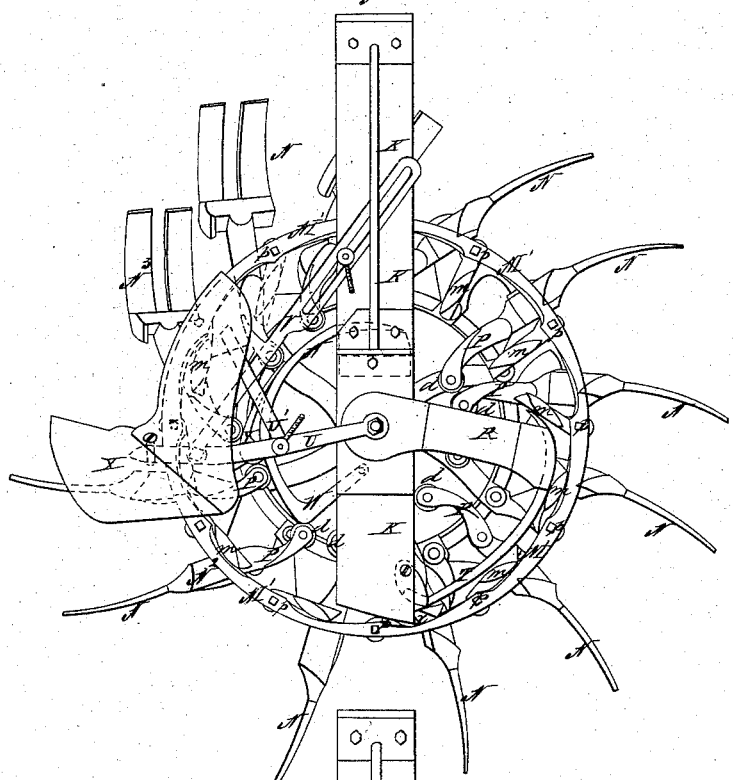
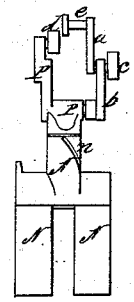
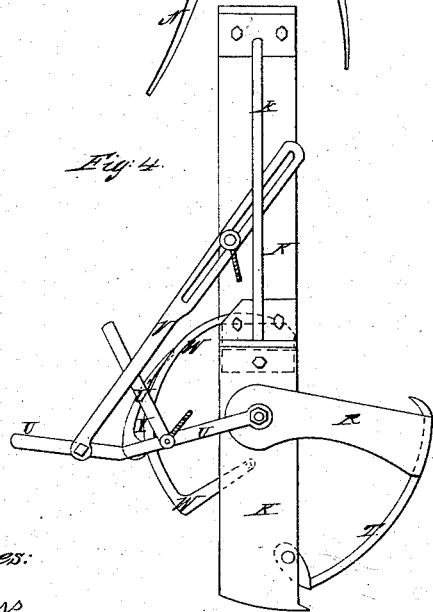
Witnesses:
N. E. Marrs
J. W. Huthet
Inventor:
Judd Stevens

UNITED STATES PATENT OFFICE.

JUDD STEVENS, OF CHICAGO, ILLINOIS, ASSIGNOR TO THE CHICAGO DITCHING AND SPADING MACHINE COMPANY.

IMPROVED DITCHING-MACHINE.

Specification forming part of Letters Patent No. 57,050, dated August 7, 1866.

*To all whom it may concern:*

Be it known that I, JUDD STEVENS, of Chicago, in the county of Cook and State of Illinois, have invented a new and useful Improvement in Ditching-Machines; and I do hereby declare that the following is a full, clear, and exact description of the same, reference being had to the accompanying drawings, and the letters and figures marked thereon, which form part of this specification.

My said invention consists in so attaching and arranging a series of shovels or spades radially upon the periphery of a revolving cylinder or wheel, and so arranging suitable stationary cams in connection therewith, that as said spades enter the ground they are forced downward into the same, and as they begin to rise at the rear of the machine, they are thrown into a horizontal position so as to retain the earth upon the same until they reach a suitable position, where they are tilted or tipped upon one edge, so as to discharge the earth therefrom upon a suitable platform, which slopes in such a manner as to discharge the earth upon one side of the trench or ditch, as desired, and as hereinafter more fully specified.

To enable those skilled in the art to understand how to construct and use my invention, I will proceed to describe the same with particularity, making reference in so doing to the aforesaid drawings, in which—

Figure 1:
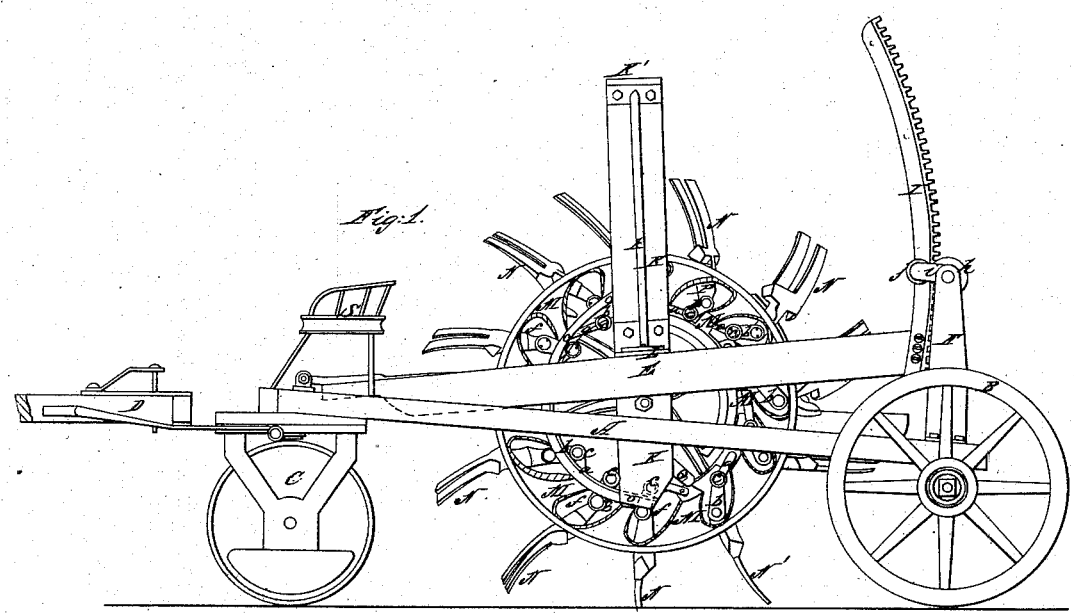
Figure 2:
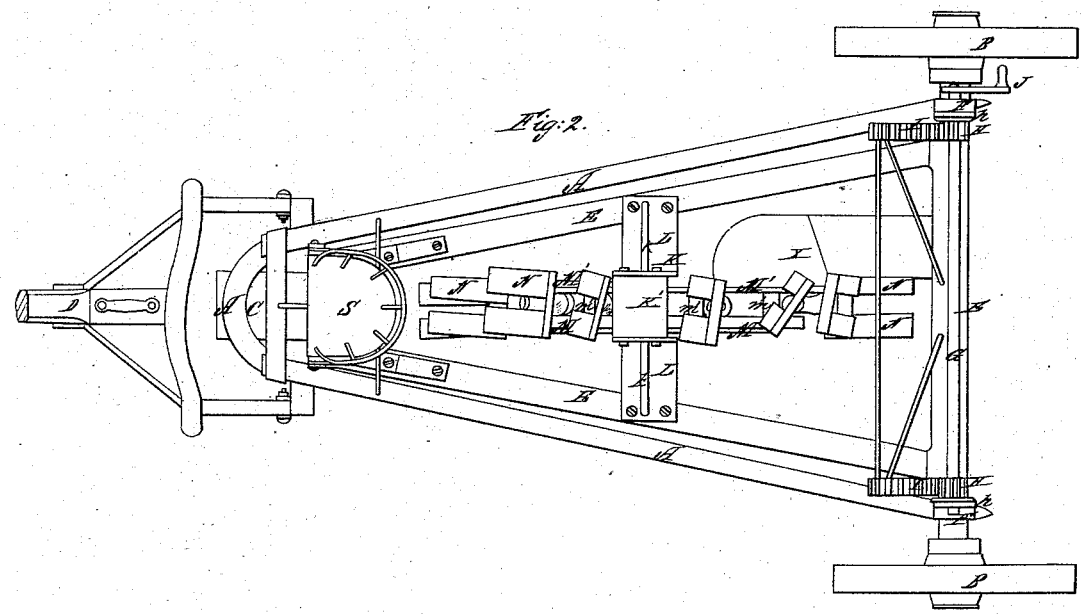

Figure 1 represents a side elevation of my invention; Fig. 2, a plan or top view of the same. Fig. 3 represents the reverse side of the aforesaid cylinder with its attachments; Fig. 4, a separate view of the cams shown in Fig. 3, and Fig. 5 a detached view of one of the shovels or spades aforesaid.

Similar letters of reference in the several figures denote the same parts of my invention.

A represents a triangular-shaped frame, the rear end being supported upon the axle of the rear wheels of the machine, as shown at B, and the front end being pivoted upon the truck of the front wheel, C, to which the draft-pole D is attached, so that said truck has a free revolving motion to facilitate the cramping or turning of the machine when desired, S representing the seat upon which the driver sits, arranged upon and properly secured to the said frame A, as shown.

E represents a secondary frame of similar configuration, which is so attached to the front of the frame A that its rear end has a vertical adjustment, as hereinafter described, for the purpose of raising and lowering the operating parts of the machine, which are mounted upon said frame E, as shown.

To the rear end of the frame A, upon each side, are attached the vertical posts marked F, in whose upper ends the horizontal shaft G has its bearings, so as to be revolved therein, when desired, by means of a crank, J. Upon said shaft G, near each end, are fixed small spurs or pinions, (marked H,) which gear into the corresponding segmental toothed arcs I, which are attached to the rear end of the adjustable frame E, as shown, *h* representing flanges fitting upon each side of said arcs, to keep the wheels properly adjusted with respect to the same, and *j* representing a roller bearing upon the back of the arcs to hold them up properly upon the said spur-wheels H, so that by revolving the said shaft G in either direction the frame E may be lowered or raised as desired, and may be secured in any required position by inserting a removable stop or pin, against which the crank-arm may rest, so as to prevent the further revolution of the shaft.

The revolving wheel or cylinder M is secured to the frame E in the following manner: It has its bearings in two upright or vertical posts or standards, K, arranged upon each side thereof and in close proximity thereto, which have lateral arms L, resting upon said frame E, and firmly secured thereto, as shown.

To strengthen the supports the braces marked *k* are employed, extending from near the upper ends of said supports K down to the outer ends of the lateral arms L, as shown.

The wheel M is so constructed, by attaching to one side thereof, at the periphery, a circular rim, (marked M' in the drawings,) as to form slots or spaces in the circumference of the wheel, through which the shovels N project, as shown, and in which they are operated, as hereinafter specified.

Corresponding with each of the aforesaid slots in the periphery of the wheel there are lateral openings, (marked *f*,) through which certain lateral attachments to the stocks of the shovels shown in Fig. 5 project, and in which they are operated by means of certain cams upon the stationary supports hereinafter more fully described.

The said shovels N are so attached to the handles or stocks P as to have a turning movement upon or within the same, and upon the end of the handle P is arranged a friction-roller, *d*, upon which a cam or cams operate, as hereinafter specified. Upon the said shovel-stock P is pivoted, as shown in Fig. 5, a strap or arm, *b*, at whose opposite end is jointed or pivoted another arm, *a*, the opposite end of which is pivoted at a fixed point to the wheel by the pivot-arm marked *e*, as shown in Fig. 1.

*c* represents a friction-roller, operated upon by a cam, O, as hereinafter set forth.

Thus it will be seen that the shovels are attached to the wheel M at a single point—to wit, the end of the jointed arms *a b*—so that the shovels have a free outward or inward movement in the direction of the radii of the wheel, also a forward and backward movement in the slots in the periphery of said wheel aforesaid, and also a rotating movement upon the handles P, as before described.

To the outer edge of said wheel M there are pivoted a series of arms or levers, (marked *m*,) being of the same number as the shovels, and being pivoted to the wheel by passing the rivets *p*, which secure the rim M' upon the wheel, through a collar upon the end of the said arms *m*.

In Fig. 1, O and Q represent cams or mechanical devices attached to the stationary supports K at such positions as at the proper time, as the machine is moved forward and the wheel revolves, to produce the desired movements of the shovels.

In Figs. 3 and 4, T, W, and Y represent other cams or mechanical devices, also attached to the stationary supports K, to produce, in like manner and at the proper time, other movements of the said shovels, all of which will, in their order, be hereinafter specifically set forth.

U, V, and U' represent arms attached to the frame K, whereby the inclined platform X, upon which the earth is discharged from the shovels, is properly secured, while at the same time, by means of the slotted arm V, it may be raised or lowered, as desired.

Upon the shovel N there is cast or otherwise fixed a diagonal rib, (marked *n*,) as seen in Fig. 5, for the purpose appearing in the description of the operation of my machine, hereinafter to be made.

Having described the nature and construction of my said invention, I will now specify and describe the operation of the same, and in so doing will trace the course and operation of one of the shovels from the point where it has discharged its burden upon the platform X around to the same point.

As the wheel revolves the shovel N passes along until the roller *c* passes under the upper end of the curved bearing or cam marked O, as shown in Fig. 1, whose distance from the center of the wheel gradually decreases toward the lower end thereof, so that the effect of said bearing is to draw the shovel back within the wheel until the head of the shovel rests firmly against the periphery of the wheel, the action of the rim of the wheel upon the diagonal rib *n*, before described, having the effect to bring the shovel at right angles across the face of the wheel, as desired.

In the meantime, as shown in Fig. 3, representing the reverse or opposite side of the wheel, the aforesaid arm *m* passes beneath the cam or curved bearing marked T, which forces said arm back into a position substantially parallel with the rim of the wheel, as shown, whereby a shoulder upon the said arm is pressed against the stock of the shovel, thus forcing the shovel into the back part of the slot in the periphery of the wheel, while at the same time the stock of the shovel P is brought against a suitable projection or shoulder upon the wheel, so that the shovel is firmly and rigidly fixed in the wheel in such a manner that as the shovel enters the ground the pressure of the earth upon the back of the shovel causes the wheel M to revolve as desired.

When the shovel has passed into the ground and reaches a position directly beneath the wheel, the said roller *c* passes from the lower end of the bearing O, and the arm *m* passes from the confining-bar T and is raised up by the projection *x*, thereby releasing the shovel from its rigid connection with the wheel, so that the wheel may slip forward upon the shovel, the slots in the periphery of the wheel permitting said movement. The said forward slip of the wheel upon the shovel is essential to the perfect working of the machine, and but for the action of the succeeding shovels would be made without any revolving motion of the wheel while taking place; but, in consequence of the rigid connection of said succeeding shovels with the wheel and the pressure upon the back of the same, said wheel revolves while the said slip is taking place, though with a retarded movement.

The necessity of the said forward slip of the wheel upon the shovels arises from the fact that the wheel is revolved by the action of the shovels in the ground, and has to move forward as fast as a wheel whose circumference would pass through the extreme points of the shovels would revolve upon the ground, and not being able to revolve more rapidly to compensate for the difference in said circumferences, this compensation is effected by the periodical stopping of the shovels in the earth for a sufficient length of time to allow said slip of the wheel upon the shovel, which produces the required result.

The length of said forward slip of the wheel is determined by the difference in the distances between the points of two consecutive shovels and the points where they respectively intersect the circumference of the wheel M. The tendency of the wheel in making said forward slip is to slide upon the ground; but the action of the shovels next in the series causes the wheel to revolve with a kind of halting or retarded movement. At about the time the said forward slip of the wheel is accomplished two other movements of the shovel occur simultaneously—to wit, as the roller $c$ aforesaid has passed from the influence of the cam-bearing O, which held the shovel-head firmly up against the periphery of the wheel M, the cam Q, acting upon the same roller $c$, acts upon the shovel in the opposite direction, forcing it out from the wheel, as shown at N' in the drawings; and at the same time the roller $d$, upon the end of the shovel-stock P, presses against the cam W, which raises or pries up the shovelful of earth, as seen at $N^2$ in Fig. 3, so as to retain the earth thereupon until it passes up to the aforesaid platform X, when one edge of the shovel strikes against the end of the arm U or cam, which tips the shovel upon one edge, and thus discharges the earth upon said platform, upon which it slides to one side and is deposited upon the ground, while the shovel moves around to repeat the operation, as described.

It will further be observed that at the same time, or about the same time, that the shovel is tipped, as aforesaid, to discharge the earth therefrom, the roller $d$ upon the shovel-stock P strikes upon another cam, (marked Y,) which still further throws up the point of the shovel, as shown at $N^3$, so as to separate it from the shovel following, and allow the latter room to be tipped, as desired.

All those parts which bear upon each other or work together in the operation of the machine are constructed with V-shaped bearings, so as to obviate the difficulty, which otherwise would occur, of the earth adhering thereto and impeding the operation of the machine.

The said machine may be used for spading as well as ditching purposes, if desired.

Having described the construction and operation of my invention, I will now specify what I claim and desire to secure by Letters Patent:

1. So attaching and arranging a series of shovels in the periphery of a wheel, M, that said wheel may have a forward slip upon the shovels, substantially as and for the purposes described.

2. In combination with the shovels and wheel aforesaid, the arrangement of the stationary curved bearing O, operating substantially as and for the purposes specified.

3. In combination with the series of shovels and wheel M, the arrangement of the pivoted arms $m$ and cam-bearing T, for the purpose of locking said shovels to the wheel, as and for the purposes set forth.

4. The arrangement of a cam, Q, with the wheel and shovels aforesaid, for the purpose and in the manner described.

5. In combination with the wheel M and shovel N, the arrangement of the cam W, operating substantially as and for the purposes specified.

6. The arrangement of the cam Y with the shovels N, for the purposes set forth.

7. Attaching the shovels to the wheel by means of the jointed arm $a\ b$, substantially as and for the purposes described.

JUDD STEVENS.

Witnesses:
W. E. MARRS,
J. W. HERTHEL.